US010394237B2

(12) United States Patent
Xu et al.

(10) Patent No.: US 10,394,237 B2
(45) Date of Patent: Aug. 27, 2019

(54) PERCEIVING ROADWAY CONDITIONS FROM FUSED SENSOR DATA

(71) Applicant: Ford Global Technologies, LLC, Dearborn, MI (US)

(72) Inventors: Wei Xu, Canton, MI (US); Fazal Urrahman Syed, Canton, MI (US); Venkatapathi Raju Nallapa, Fairfield, CA (US); Scott Vincent Myers, Camarillo, CA (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 104 days.

(21) Appl. No.: 15/259,513

(22) Filed: Sep. 8, 2016

(65) Prior Publication Data

US 2018/0067487 A1  Mar. 8, 2018

(51) Int. Cl.
| | |
|---|---|
| *G01C 22/00* | (2006.01) |
| *G05D 1/00* | (2006.01) |
| *G05D 1/02* | (2006.01) |
| *G01S 17/02* | (2006.01) |
| *G01S 17/66* | (2006.01) |
| *G01S 17/87* | (2006.01) |
| *G01S 17/89* | (2006.01) |
| *G01S 17/93* | (2006.01) |

(Continued)

(52) U.S. Cl.
CPC .......... *G05D 1/0088* (2013.01); *G01S 17/023* (2013.01); *G01S 17/66* (2013.01); *G01S 17/87* (2013.01); *G01S 17/89* (2013.01); *G01S 17/936* (2013.01); *G05D 1/0242* (2013.01); *G05D 1/0246* (2013.01); *G05D 1/0248* (2013.01); *G05D 1/0278* (2013.01); *G01S 13/865* (2013.01); *G01S 2013/9367* (2013.01)

(58) Field of Classification Search
CPC .... G01S 17/00; G05D 1/0088; G05D 1/0242; G05D 1/0246; G05D 1/0248; G05D 1/0278
See application file for complete search history.

(56) References Cited

U.S. PATENT DOCUMENTS

| | | | |
|---|---|---|---|
| 6,593,960 B1 * | 7/2003 | Sugimoto | ............... B60R 11/04 348/142 |
| 8,139,141 B2 | 3/2012 | Bamji | |

(Continued)

FOREIGN PATENT DOCUMENTS

WO  WO-2015161208 A1  10/2015

*Primary Examiner* — Harry Y Oh
(74) *Attorney, Agent, or Firm* — David R. Stevens; Stevens Law Group

(57) ABSTRACT

The present invention extends to methods, systems, and computer program products for perceiving roadway conditions from fused sensor data. Aspects of the invention use a combination of different types of cameras mounted to a vehicle to achieve visual perception for autonomous driving of the vehicle. Each camera in the combination of cameras generates sensor data by sensing at least part of the environment around the vehicle. The sensor data form each camera is fused together into a view of the environment around the vehicle. Sensor data from each camera (and, when appropriate, each other type of sensor) is fed into a central sensor perception chip. The central sensor perception chip uses a sensor fusion algorithm to fuse the sensor data into a view of the environment around the vehicle.

19 Claims, 6 Drawing Sheets

(51) Int. Cl.
   *G01S 13/86* (2006.01)
   *G01S 13/93* (2006.01)

(56) References Cited

U.S. PATENT DOCUMENTS

| | | | |
|---|---|---|---|
| 8,446,470 | B2 | 5/2013 | Lu |
| 8,576,286 | B1* | 11/2013 | Childs .................... G01C 21/00 348/113 |
| 8,648,702 | B2 | 2/2014 | Pala |
| 8,983,717 | B2* | 3/2015 | Pupin ................ B62D 15/0295 701/36 |
| 9,069,075 | B2 | 6/2015 | Zeng |
| 2007/0219720 | A1* | 9/2007 | Trepagnier ............ B60W 30/00 701/300 |
| 2007/0291130 | A1* | 12/2007 | Broggi ................. G01S 17/023 348/218.1 |
| 2012/0056988 | A1 | 3/2012 | Stanhill |
| 2013/0278769 | A1* | 10/2013 | Nix ......................... H04N 7/18 348/148 |
| 2015/0103159 | A1 | 4/2015 | Shashua |
| 2015/0293534 | A1* | 10/2015 | Takamatsu ............ B60W 30/00 701/28 |
| 2016/0148062 | A1 | 5/2016 | Fürsich |

* cited by examiner

PERCEIVING ROADWAY CONDITIONS FROM FUSED SENSOR DATA

CROSS-REFERENCE TO RELATED APPLICATIONS

Not applicable.

BACKGROUND

1. Field of the Invention

This invention relates generally to the field of autonomous vehicles, and, more particularly, to perceiving roadway conditions from fused sensor data.

2. Related Art

Autonomous driving solutions typically use LIDAR sensors to perceive the environment surrounding a vehicle. LIDAR sensors are mounted on a vehicle, often on the roof. The LIDAR sensors have moving parts enabling sensing of the environment 360-degrees around the vehicle out to a distance of around 100-150 meters. Sensor data from the LIDAR sensors is processed to perceive a "view" of the environment around the vehicle. The view is used to automatically control vehicle systems, such as, steering, acceleration, braking, etc. to navigate within the environment. The view is updated on an ongoing basis as the vehicle navigates (moves within) the environment.

BRIEF DESCRIPTION OF THE DRAWINGS

The specific features, aspects and advantages of the present invention will become better understood with regard to the following description and accompanying drawings where.

DETAILED DESCRIPTION

The present invention extends to methods, systems, and computer program products for perceiving roadway conditions from fused sensor data.

Many autonomous driving vehicles use LIDAR sensors to view the environment around a vehicle. However, LIDAR sensors are relatively expensive and include mechanical rotating parts. Further, LIDAR sensors are frequently mounted on top of vehicles limiting aesthetic designs. Aspects of the invention can provide reliable autonomous driving with lower cost sensors and improved aesthetics.

For example, aspects of the invention use a combination of different types of cameras mounted to a vehicle to achieve visual perception for autonomous driving of the vehicle. Each camera in the combination of cameras generates sensor data by sensing at least part of the environment around the vehicle. The sensor data form each camera is fused together into a view of the environment around the vehicle.

The combination of cameras can include a multipurpose time-of-flight (TOF) camera with a processing chip, such as, for example, a Red-Green-Blue-Infrared (RGB-IR) complementary metal-oxide semiconductor (CMOS) chip. The TOF camera is configured to switch between camera mode and LIDAR mode. The TOF camera uses a narrow field-of-view (FOV) lens to facilitate longer distance object tracking capability. The TOF camera can be used for collision control and adaptive cruise control.

The combination of cameras can also include one or more RGB-IR cameras. The one or more RGB-IR cameras use a wider FOV to sense objects closer to the vehicle. Intensity information from the IR signals can be used during the night as well as in other low (or no) light environments.

In one aspect, one or more other sensors are also mounted to the vehicle. The one or more other sensors can be of the same or different sensor types, such as, for example, Radar, ultrasonic, global positioning system (GPS), inertial measurement unit (IMU), etc. The one or more other sensors also generate sensor data by sensing at least part of the environment around the vehicle.

Sensor data from each camera (and, when appropriate, each other type of sensor) is fed into a central sensor perception chip. The central sensor perception chip uses a sensor fusion algorithm to fuse the sensor data into a view of the environment around the vehicle.

Figure 1:
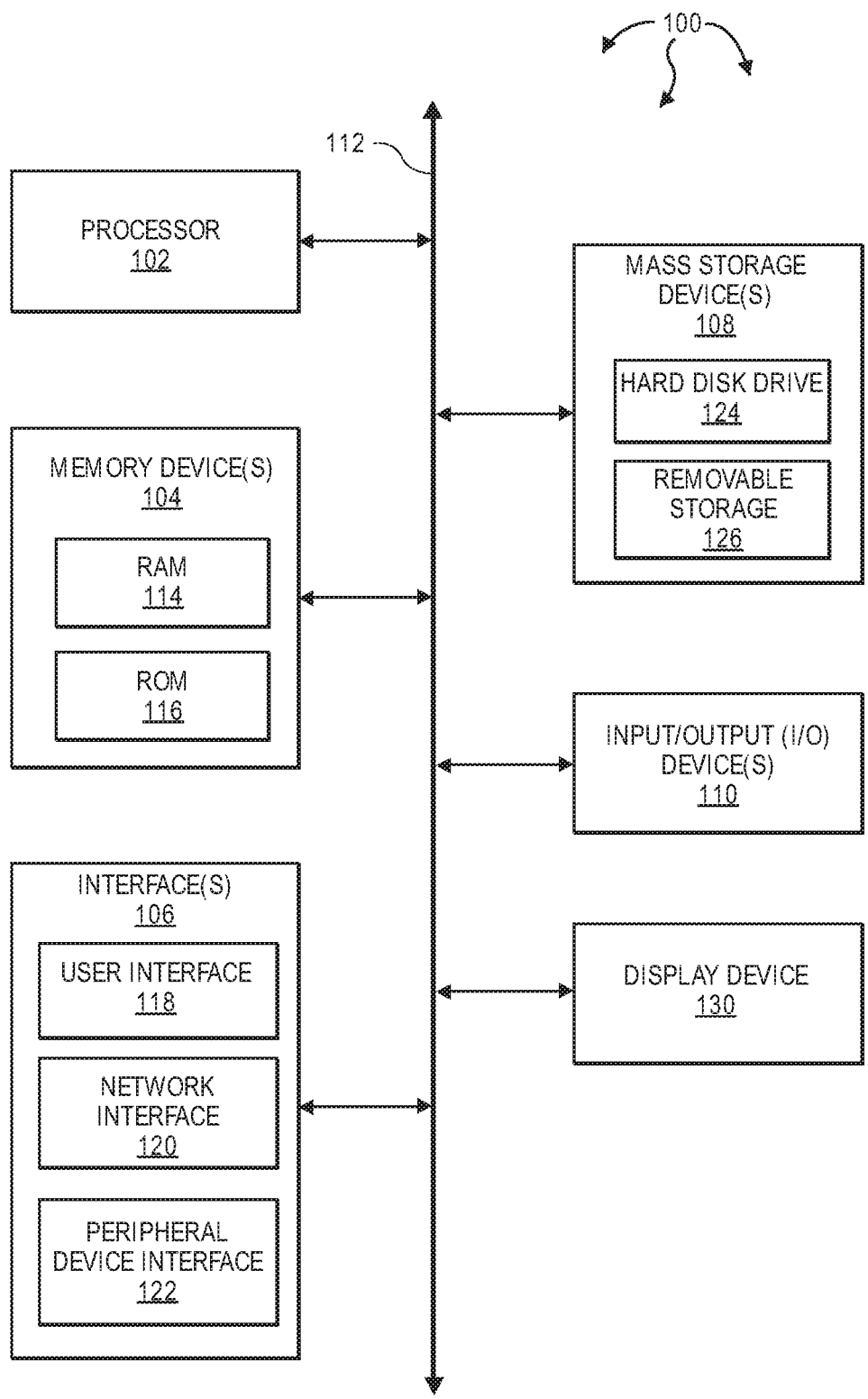
FIG. 1 illustrates an example block diagram of a computing device.

Aspects of the invention can be implemented in a variety of different types of computing devices. FIG. 1 illustrates an example block diagram of a computing device 100. Computing device 100 can be used to perform various procedures, such as those discussed herein. Computing device 100 can function as a server, a client, or any other computing entity. Computing device 100 can perform various communication and data transfer functions as described herein and can execute one or more application programs, such as the application programs described herein. Computing device 100 can be any of a wide variety of computing devices, such as a mobile telephone or other mobile device, a desktop computer, a notebook computer, a server computer, a handheld computer, tablet computer and the like.

Computing device 100 includes one or more processor(s) 102, one or more memory device(s) 104, one or more interface(s) 106, one or more mass storage device(s) 108, one or more Input/Output (I/O) device(s) 110, and a display device 130 all of which are coupled to a bus 112. Processor(s) 102 include one or more processors or controllers that execute instructions stored in memory device(s) 104 and/or mass storage device(s) 108. Processor(s) 102 may also include various types of computer storage media, such as cache memory.

Memory device(s) 104 include various computer storage media, such as volatile memory (e.g., random access memory (RAM) 114) and/or nonvolatile memory (e.g., read-only memory (ROM) 116). Memory device(s) 104 may also include rewritable ROM, such as Flash memory.

Mass storage device(s) 108 include various computer storage media, such as magnetic tapes, magnetic disks, optical disks, solid state memory (e.g., Flash memory), and so forth. As depicted in FIG. 1, a particular mass storage device is a hard disk drive 124. Various drives may also be included in mass storage device(s) 108 to enable reading from and/or writing to the various computer readable media. Mass storage device(s) 108 include removable media 126 and/or non-removable media.

I/O device(s) 110 include various devices that allow data and/or other information to be input to or retrieved from computing device 100. Example I/O device(s) 110 include cursor control devices, keyboards, keypads, barcode scanners, microphones, monitors or other display devices, speakers, printers, network interface cards, modems, cameras, lenses, radars, CCDs or other image capture devices, and the like.

Display device 130 includes any type of device capable of displaying information to one or more users of computing device 100. Examples of display device 130 include a monitor, display terminal, video projection device, and the like.

Interface(s) 106 include various interfaces that allow computing device 100 to interact with other systems, devices, or computing environments as well as humans. Example interface(s) 106 can include any number of different network interfaces 120, such as interfaces to personal area networks (PANs), local area networks (LANs), wide area networks (WANs), wireless networks (e.g., near field communication (NFC), Bluetooth, Wi-Fi, etc., networks), and the Internet. Other interfaces include user interface 118 and peripheral device interface 122.

Bus 112 allows processor(s) 102, memory device(s) 104, interface(s) 106, mass storage device(s) 108, and I/O device(s) 110 to communicate with one another, as well as other devices or components coupled to bus 112. Bus 112 represents one or more of several types of bus structures, such as a system bus, PCI bus, IEEE 1394 bus, USB bus, and so forth.

Figure 2:
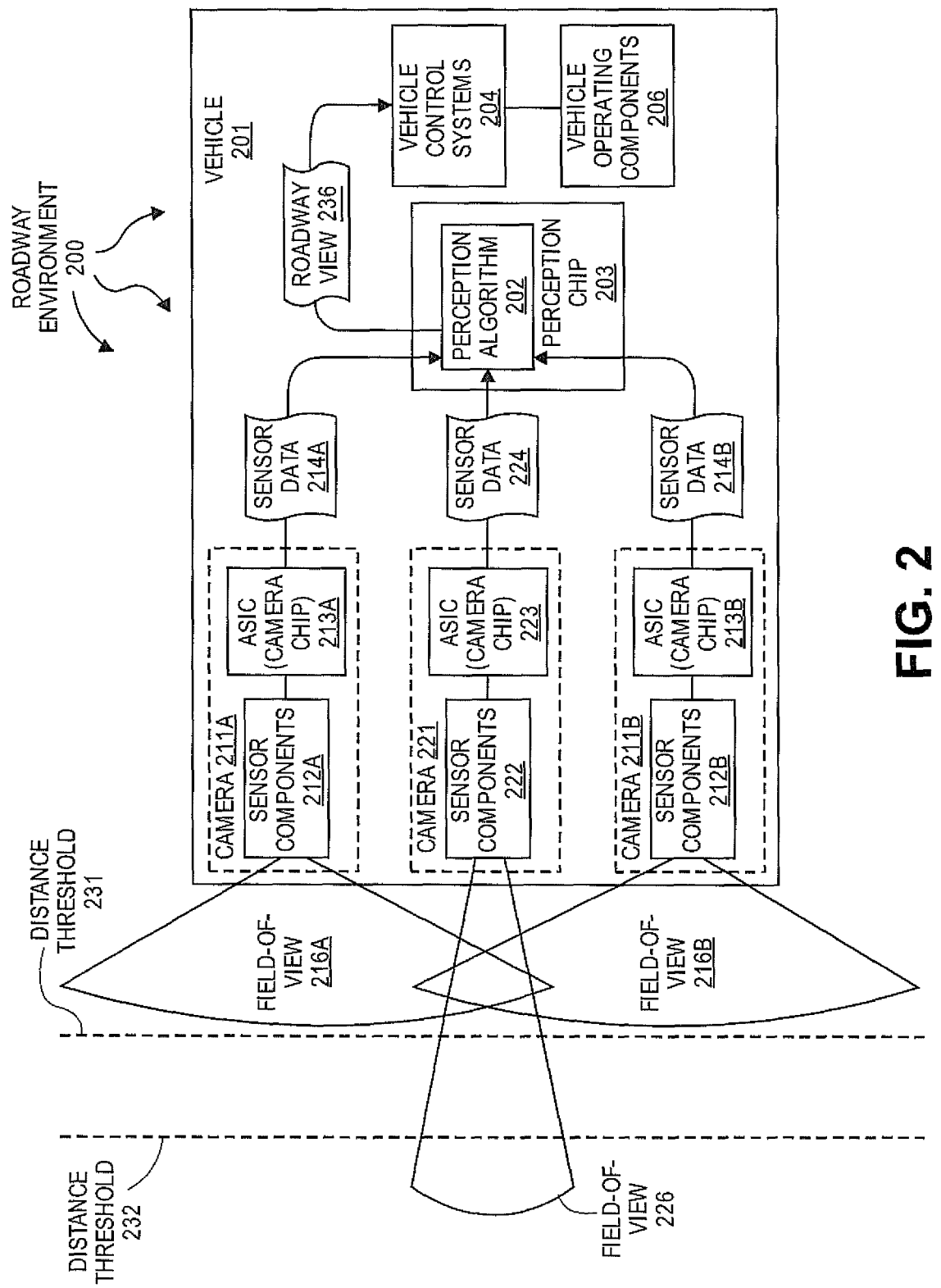
FIG. 2 illustrates an example environment that facilitates perceiving roadway conditions from fused sensor data.

FIG. 2 illustrates an example roadway environment 200 that facilitates perceiving roadway conditions from fused sensor data. Roadway environment 200 includes vehicle 201, such as, for example, a car, a truck, or a bus. Vehicle 201 may or may not contain any occupants, such as, for example, one or more passengers. Roadway environment 200 can include roadway markings (e.g., lane boundaries), pedestrians, bicycles, other vehicles, signs, or any other types of objects. Vehicle 201 can be moving within roadway environment 200, such as, for example, driving on a road.

Vehicle 201 includes camera 211A, camera 211B, camera 221, perception chip 203, perception algorithm 202, vehicle control systems 204, and vehicle operating components 206. Cameras 211A, 211B, and 221 can be mounted to vehicle 201 to face in the direction vehicle 201 is moving (e.g., forward or backwards). In one aspect, vehicle 201 also includes a corresponding set of cameras facing the other direction. For example, vehicle 201 can include a set of from facing cameras and a set of rear facing cameras.

Camera 211A includes sensor components 212A (e.g., a lens, an aperture, a shutter, a sensor plate, an IR emitter, an IR detector, etc.) and application-specific integrated circuit (ASIC) 213A. ASIC 213A can include digital signal processing (DSP) functionality to perform various operations on image sensor data captured by sensor components 212A. Similarly, camera 211B includes sensor components 212B (e.g., a lens, aperture, shutter, sensor plater, an IR emitter, an IR detector, etc.) and application-specific integrated circuit (ASIC) 213B. ASIC 213B can include digital signal processing (DSP) functionality to perform various operations on image sensor data captured by sensor components 212B.

Cameras 211A and 211B can be similar types, or even the same type, of camera. Cameras 211A and 211B have fields-of-view 216A and 216B respectively. Fields-of-view 216A and 216B can be similar and possibly even essentially the same. Within fields-of-view 216A and 216B, cameras 211A and 211B respectively can sense roadway environment 200 from vehicle 201 out to approximately distance threshold 231.

In one aspect, cameras 211A and 211B are Red-Green-Blue/Infrared (RGB/IR) cameras. Thus, cameras 211A and 211B can generate images where each image section includes a Red pixel, a Green pixel, a Blue pixel, and an IR pixel. The RGB pixel intensities are used when there is sufficient light (e.g., during daytime). The intensity information from the IR pixels can be used during the night as well as in other low (or no) light environments to sense roadway environment 200. Low (or no) light environments can include travel through tunnels or other environments where natural light is obstructed.

Camera 221 includes sensor components 222 (e.g., a lens, an aperture, a shutter, a sensor plate, a laser, a sensor for detecting laser reflections, etc.) and application-specific integrated circuit (ASIC) 223. ASIC 223 can include digital signal processing (DSP) functionality to perform various operations on image sensor data captured by sensor components 222. Camera 221 has field-of-view 226. Within field-of-view 226, camera 221 can sense roadway environment 200 from vehicle 201 to beyond distance threshold 232. Camera 221 can be used for collision control and adaptive cruise control.

In one aspect, camera 221 is a multipurpose time-of-flight (TOF) camera with a processing chip, such as, for example, a Red-Green-Blue-Infrared (RGB-IR) complementary metal-oxide semiconductor (CMOS) chip. Camera 221 can be configured to operate in different modes when objects are sensed at different distances from vehicle 201. Camera 221 can operate primarily in LIDAR mode when objects within field-of-view 226 are detected beyond distance threshold 232. On the other hand, camera 221 can switch between camera mode and LIDAR mode when objects within field-of-view 226 are detected between distance threshold 231 and distance threshold 232. For example, camera 221 can operate approximately 50% of the time in LIDAR mode and 50% of the time in camera mode when objects within field-of-view 226 are detected between distance threshold 231 and distance threshold 232.

Camera 221 can generate images where each image section includes a Red pixel, a Green pixel, a Blue pixel, and an IR pixel. The RGB pixel intensities are used when there is sufficient light (e.g., during daytime). In LIDAR mode, the laser emits a pulse of IR wavelength. A processing chip (e.g., within ASIC 223) reads the time of flight information to process depth of objects. The processing chip can set appropriate IR pixel intensity information based on object depths. LIDAR mode and IR pixel intensity can be used during the night, in other low (or no) light environments, or when otherwise appropriate, to sense roadway environment 200.

In one aspect, distance threshold 231 is approximately 20 meters from vehicle 201 and distance threshold 232 is approximately 100 meters from vehicle 201. However, other distances for distance thresholds 231 and 232 are also possible. For example, distance threshold 231 can range from 0-20 meters and distance threshold 232 can range from 20-200 meters.

Perception chip 203 can be a general or special purpose processing unit, such as for example, a Central Processing Unit (CPU), a Graphics Processing Unit (GPU), etc. Alternately and/or in combination, perception chip 203 can also include logic circuits, such as, for example, in an ASIC or Field-Programmable Gate Array (FPGA). Perception algorithm 202 runs on perception chip 203.

In general, perception algorithm 202 is configured to fuse sensor data from different cameras (and possibly other sensors) into a view of roadway environment 200. Perception algorithm 202 can process camera sensor data to identify objects of interest within roadway environment 200. Perception algorithm 202 can also classify objects of interest within roadway environment 200. Object classifications can include: lane boundaries, cross-walks, signs, control signals, cars, trucks, pedestrians, etc. Some object classifications can have sub-classifications. For example, a sign can be classified by sign type, such as, a stop sign, a yield sign, a school zone sign, a speed limit sign, etc.

Perception algorithm 202 can also determine the location of an object within roadway environment 200, such as, for example, between vehicle 201 and distance threshold 231, between distance threshold 231 and distance threshold 232, or beyond distance threshold 232. If an object is moving, perception algorithm 202 can also determine a likely path of the object.

In one aspect, perception algorithm 202 includes a neural network architected in accordance with a multi-layer (or "deep") model. A multi-layer neural network model can include an input layer, a plurality of hidden layers, and an output layer. A multi-layer neural network model may also include a loss layer. For classification of fused camera sensor data (e.g., an image), values in the sensor data (e.g., pixel-values) are assigned to input nodes and then fed through the plurality of hidden layers of the neural network. The plurality of hidden layers can perform a number of non-linear transformations. At the end of the transformations, an output node yields a perceived view of roadway environment 200.

Perception algorithm 202 can send roadway views to vehicle control systems 204. Vehicle control systems 204 (e.g., cruise control, lane changing, collision avoidance, braking, steering, etc.) are configured to control vehicle operating components 206 (e.g., accelerator, brakes, steering wheel, transmission, etc.) to autonomously operate vehicle 201 in roadway environment 200. Vehicle control systems 204 can change the configuration of vehicle operating components 206 based on roadway views received from perception algorithm 202. Changes to vehicle operating components 206 can facilitate turning vehicle 201, speeding up vehicle 201, slowing down vehicle 201, reversing the direction of vehicle 201, etc.

Vehicle 201 can also include one or more other sensors. The one or more other sensors can be of the same or different sensor types, such as, for example, Radar, ultrasonic, inertial measurement unit (IMU), global positioning system (GPS), etc. The one or more other sensors can also generate sensor data by sensing at least part of roadway environment 200. Perception algorithm 202 can fuse sensor data from these other sensors with sensor data from cameras 211A, 211B, and 221 (as well as any other cameras) into a view of roadway environment 200.

Figure 3:
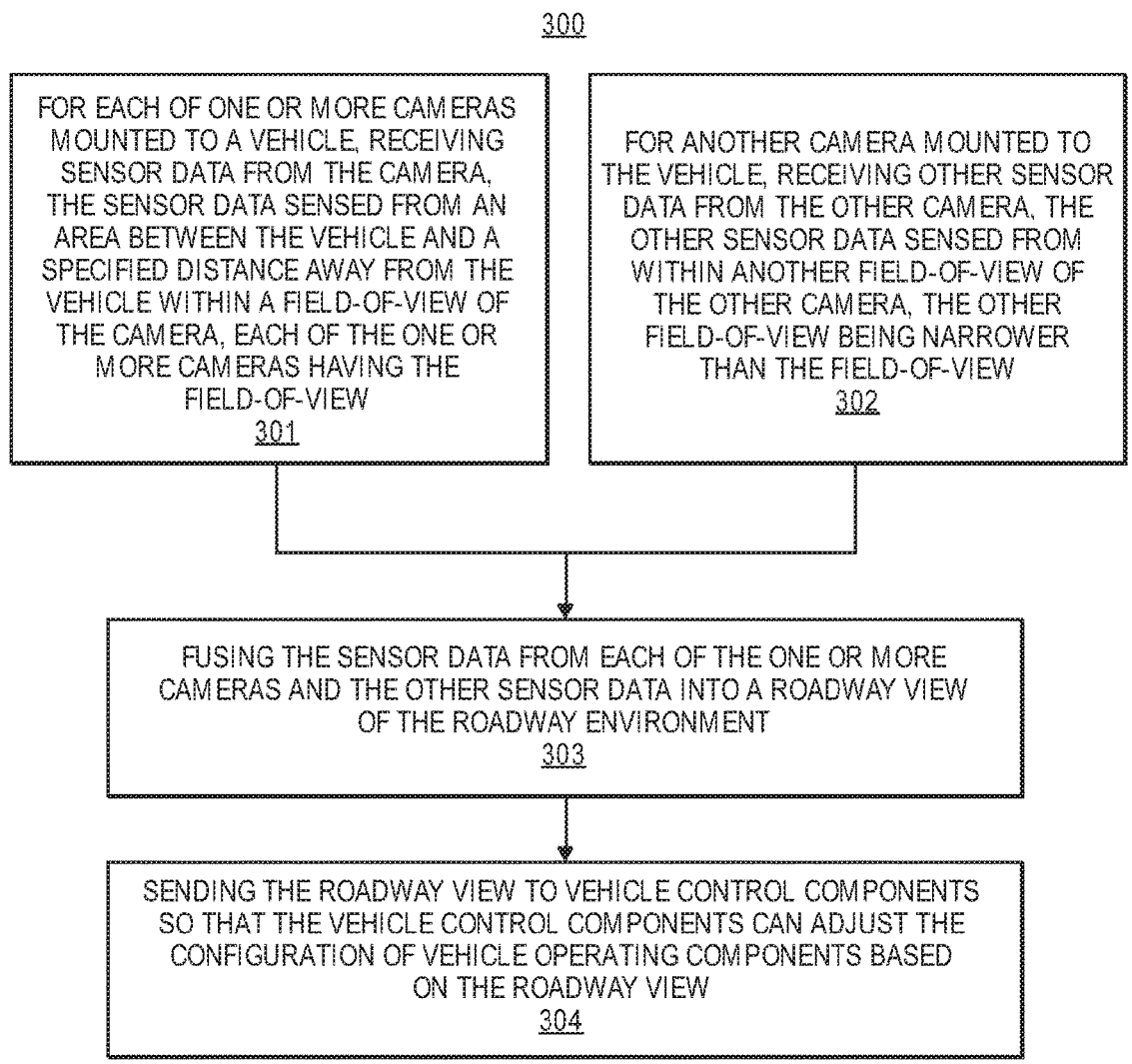
FIG. 3 illustrates a flow chart of an example method for perceiving roadway conditions from fused sensor data.

FIG. 3 illustrates a flow chart of an example method 300 for perceiving roadway conditions from fused sensor data. Method 300 will be described with respect to the components and data of environment 200.

Method 300 includes for each of one or more cameras mounted to a vehicle, receiving sensor data from the camera, the sensor data sensed from an area between the vehicle and a specified distance away from the vehicle within a field-of-view of the camera, each of the one or more cameras having the field-of-view (301). For example, perception algorithm 202 can receive sensor data 214A from camera 211A. Camera 211A can sense sensor data 214A from an area between vehicle 201 and distance threshold 231 within field-of-view 216A. Camera 211A can send sensor data 214A to perception algorithm 202. Similarly, perception algorithm 202 can receive sensor data 214B from camera 211B. Camera 211B can sense sensor data 214B from an area between vehicle 201 and distance threshold 231 within field-of-view 216B. Camera 211B can send sensor data 214B to perception algorithm 202. Objects within fields-of-view 216A and 216B can be clustered and tracked through image information. Sensor data 214A and 214B can indicate objects being tracked within fields-of-view 216A and 216B.

Method 300 includes for another camera mounted to the vehicle, receiving other sensor data from the other camera. the other sensor data sensed from an area beyond the specified distance within another field-of-view of the other camera, the other field-of-view being narrower than the field-of-view (302). For example, perception algorithm 202 can receive sensor data 224 from camera 221. In general, camera 221 can sense sensor data 224 anywhere within field-of-view 226. Camera 221 can send sensor data 224 to perception algorithm 202. Using different mechanisms, objects within field-of-view 226 can tracked. Sensor data 224 can indicate objects being tracked within field-of-view 226.

In one aspect, camera 221 operates in LIDAR mode to sense sensor data 224 from an area beyond distance threshold 232 within field-of-view 226. Beyond distance threshold 232, objects can be tracked based on three-dimensional (3D) point clouds. In another aspect, camera 221 switches between camera mode and LIDAR mode to sense sensor data 224 from an area between distance threshold 231 and distance threshold 232 within field-of-view 226. Between distance threshold 231 and distance threshold 232, objects can be clustered and tracked through both 3D point clouds and image information.

In a further aspect, camera 211 senses sensor data 224 from an area around (and potentially somewhat inside of) distance threshold 231, for example, when objects are close to the area covered by cameras 211A and 211B. Camera 221 estimates the position of objects through a motion tracking, such as, for example, Kalman filter, optical flow, etc.

Method 300 includes fusing the sensor data from each of the one or more cameras and the other sensor data into a roadway view of the roadway environment (303). For example, perception algorithm 202 can fuse sensor data 214A, sensor data 214B, and sensor data 224 into roadway view 226 of road way environment 200. Roadway view 236 can indicate objects that are being tracked with in fields-of-view 216A, 216B, and 226.

Method 300 includes sending the roadway view to vehicle control components so that the vehicle control components can adjust the configuration of vehicle operating components based on the roadway view (304). For example, perception algorithm can send roadway view 236 to vehicle control systems 204. Vehicle control systems 204 can receive roadway view 236 from perception algorithm 202. Vehicle control systems 204 can use roadway view 236 to adjust vehicle operating components 206. Adjusting vehicle operating components 206 can change the configuration of vehicle 201 to adapt to roadway environment 200. For example, vehicle control systems 204 can adjust vehicle operating components 206 to increase the speed of vehicle 201 (e.g., accelerate), to decrease the speed of vehicle 201 (e.g., decelerate or brake), to reverse directions of vehicle 201 (e.g., change gears from drive to reverse or vice versa), change the trajectory of vehicle 201 for a turn or lane merge (e.g., adjust the angle of front tires), etc.

Cameras 211A, 211B, and 221 (as well as any other cameras and/or other sensors) can collect sensor data on an ongoing basis as vehicle 201 is in motion. The sensor data can be sent to perception algorithm 202. Perception algorithm 202 can fuse the sensor data into additional roadway views. Vehicle control systems 204 can use the additional roadway views to adjust vehicle operating components 206 on an ongoing basis to autonomously operate vehicle 201 within roadway environment 200 in a safe manner.

Figure 4:
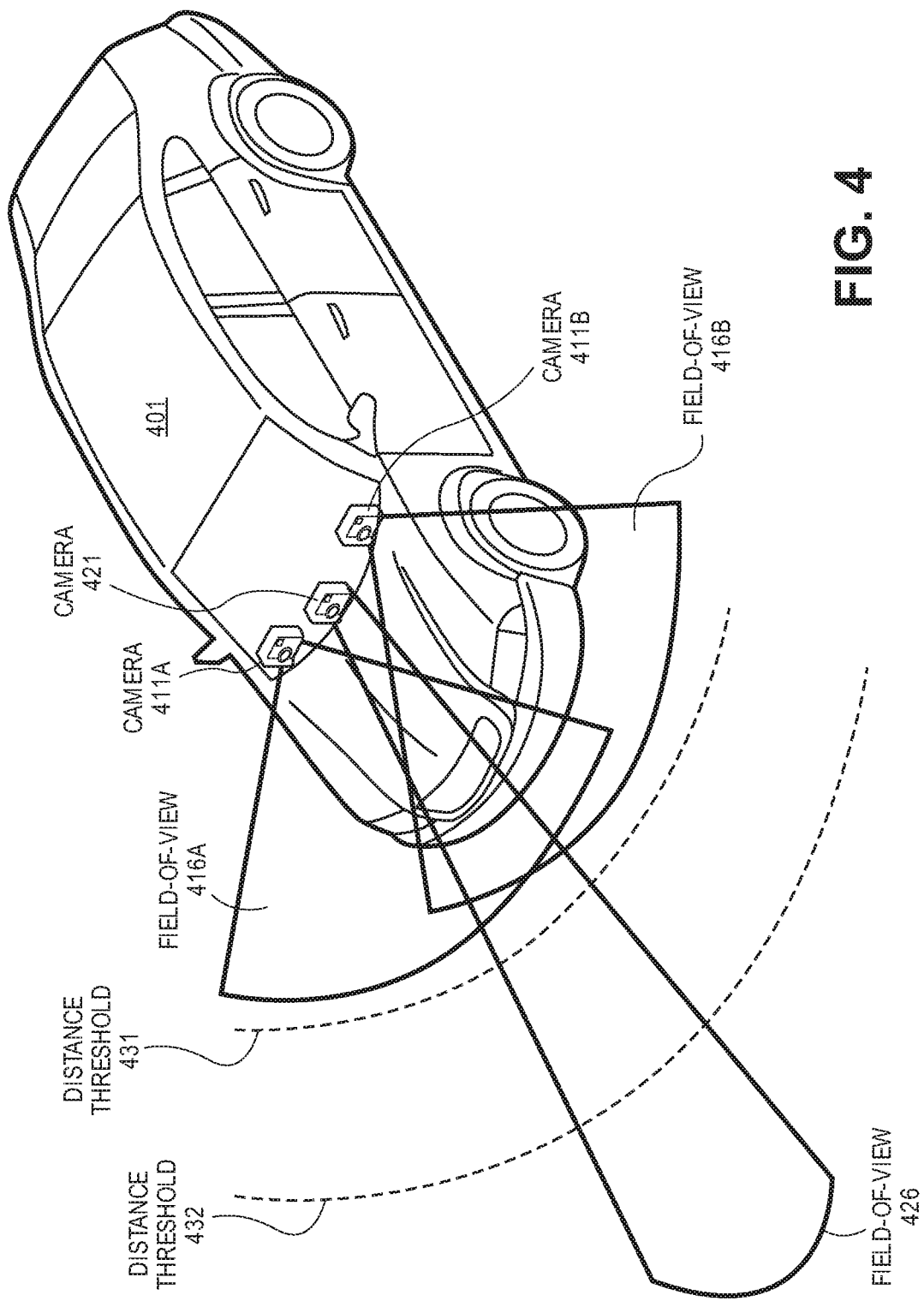
FIG. 4 illustrates an example vehicle that can perceive roadway conditions from fused sensor data.

FIG. 4 illustrates an example vehicle 401 that can perceive roadway conditions from fused sensor data. As depicted, vehicle 401 has front mounted cameras 411A, 411B, and 421. Front mounted cameras 411A, 411B, and 421 have corresponding fields-of-view 416A, 416B, and 426 respectively. Cameras 411A and 411B can be RGB/IR cameras. Cameras 411A and 411B can sense objects between vehicle 401 and distance threshold 431 that are within fields-of-view 416A and 416B. Cameras 411A and 411B can use image information to track objects within fields-of-view 416A and 416B.

Camera 421 can be a Time-Of-Flight (TOF) based camera capable of switching between a camera mode and a LIDAR mode. Camera 421 can sense objects within field-of-view 426. Camera 421 can use different mechanisms to sense objects depending on how far away the objects are from vehicle 401. Camera 421 can primarily use LIDAR mode and 3D point clouds to track objects outside of distance threshold 432. Camera 421 can switch between camera mode and LIDAR mode and use 3D point clouds and image information to track objects between distance thresholds 431 and 432. Camera 421 can primarily use camera mode and image information to track objects approaching or that recently moved inside of distance threshold 431.

A fusion algorithm can fuse together sensor data received from front mounted cameras 411A, 411B, and 421 into a roadway view of the road in front of vehicle 401. Vehicle control systems can use the roadway view to adjust vehicle operating controls to autonomously operate vehicle 401 on the roadway in a safe manner.

Figure 5:
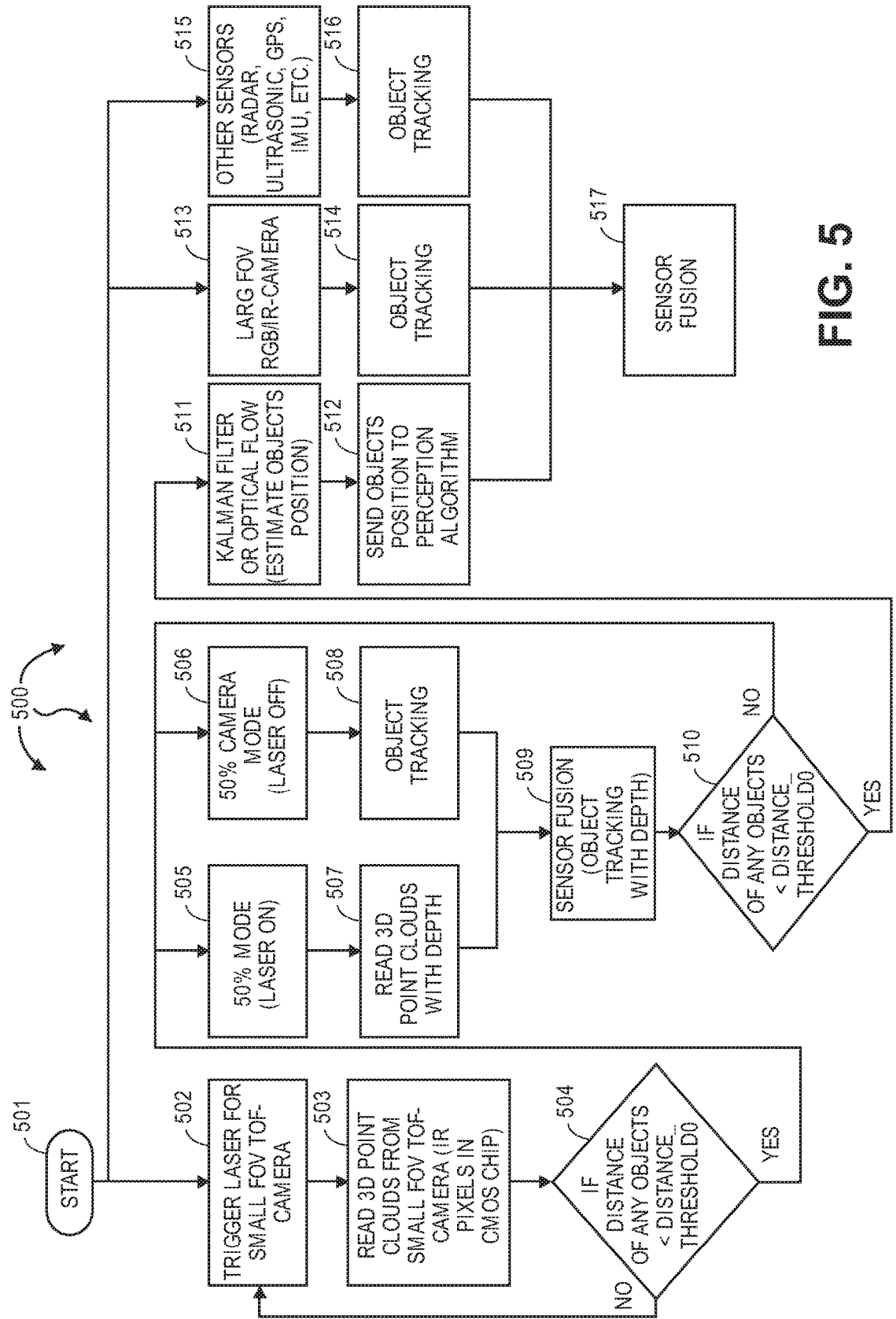
FIG. 5 illustrates an example data flow for collecting sensor data for fusion into a roadway view.

FIG. 5 illustrates an example data flow 500 for collecting sensor data for fusion into a roadway view. Data flow 500 starts at 501. In 502, a laser is triggered for a smaller field-of-view for a Time-of-Flight (TOF) camera. In 503, objects (e.g., in a roadway) are tracked based 3D point clouds read from the TOF camera. The 3D point cloud includes RGB pixels as well as IR pixels. The TOF camera detects 504 if any objects are within a further distance threshold (e.g., 232, 432, etc.). If not, data flow 500 loop back to 502. If so, an object may be between the further distance threshold and a closer distance threshold (e.g., 231, 431, etc.) and data flow proceeds to 505 and 506.

At 505 and 506, the TOF camera is switched between laser mode and camera mode. At 507, objects (e.g., within the roadway) are tracked based 3D point clouds with depth read from the TOF camera. At 509, objects (e.g., within the roadway) are tracked using image information. At 508, a fusion algorithm fuses sensor data for object tracking with depth. At 510, the TOF camera detects if any objects are within the closer distance threshold. If not, data flow 500 loops back to 505 and 506.

If so, data flow 500 proceeds to 511. At 511, the TOF camera uses a Kalman filter or optical flow to estimate object positions. At 512, the TOF camera sends objects position to a perception algorithm. At 513, large field-of-view RGB/IR cameras generate image data. Objects are tracked from within the image data. At 514, tracked objects (e.g., within the roadway) are sent to the perception algorithm. At 515, other sensors generate sensor data. Objects are tracked within the sensor data. At 516, tracked objects (e.g., within the roadway) are sent to the perception algorithm. At 517, the fusion algorithm fuses tracked objects into a roadway view (e.g., of the roadway).

Figure 6:
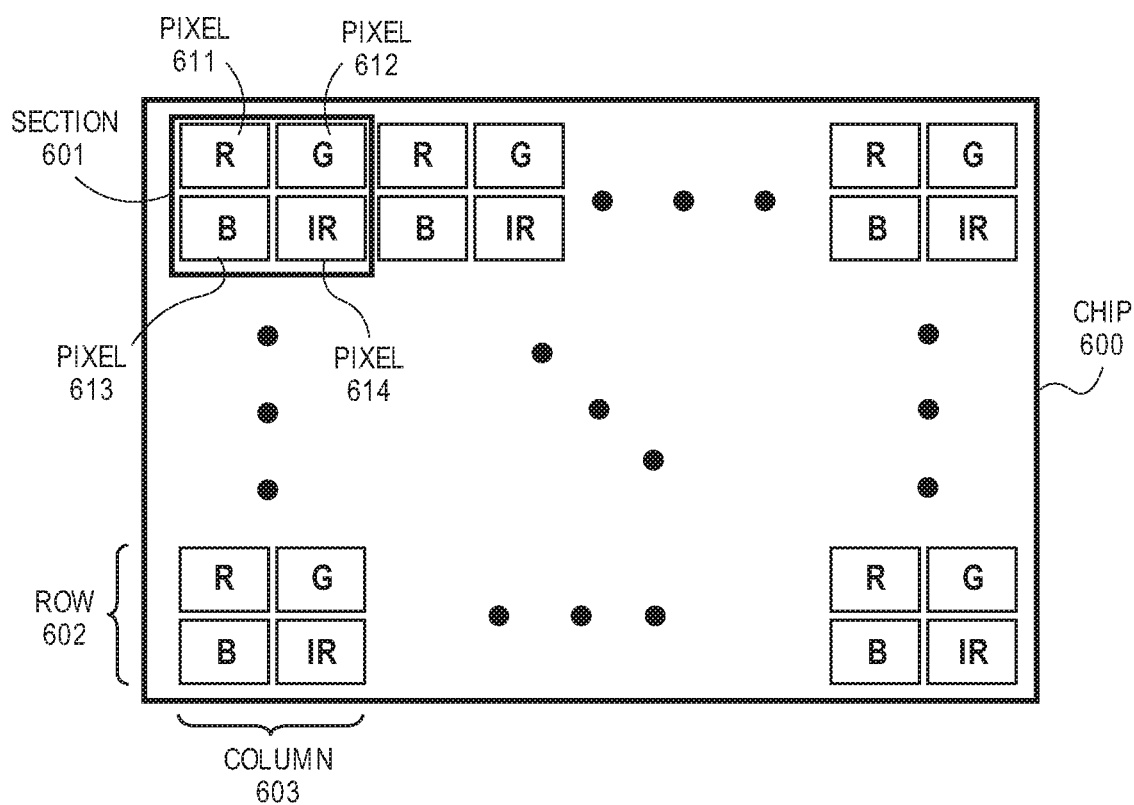
FIG. 6 illustrates an example of a chip with RGB-IR pixels.

FIG. 6 illustrates an example of a chip 600 with RGB-IR pixels. In one aspect, chip 600 is a CMOS/Charge-Coupled Device (CCD) chip. As depicted, chip 600 has four different kinds of pixels: Red pixels, Green pixels, Blue pixels, and IR pixels. Pixels are grouped into sections. Each section includes one Red pixel, one Green pixel, one Blue pixel, and one IR pixel. For example, section 601 includes Red pixel 611, Green pixel 612, Blue pixel 613, and IR pixel 614. The sections are arranged into rows and columns, including row 602 and column 603.

Chip 600 can be used to store local sensor information in a camera (e.g., pixel intensities). An ASIC within the camera can process the local sensor information stored in the chip. The ASIC can forward the processed sensor information to a central sensor perception chip, such as, for example, perception chip 203. At the central sensor perception chip, a fusion algorithm can fuse the processed sensor information along with other processed sensor data from other cameras (and/or other sensors) into a roadway view. The roadway view can be used to facilitate autonomous operation of a vehicle.

In one aspect, one or more processors are configured to execute instructions (e.g., computer-readable instructions, computer-executable instructions, etc.) to perform any of a plurality of described operations. The one or more processors can access information from system memory and/or store information in system memory. The one or more processors can transform information between different formats, such as, for example, sensor data, image data, pixel values, pixel intensities, roadway views, etc.

System memory can be coupled to the one or more processors and can store instructions (e.g., computer-readable instructions, computer-executable instructions, etc.) executed by the one or more processors. The system memory can also be configured to store any of a plurality of other types of data generated by the described components, such as, for example, sensor data, image data, pixel values, pixel intensities, roadway views, etc.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash or other vehicle computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

What is claimed:

1. A method comprising:
sensing sensor data by a camera included in a vehicle and having a first field-of-view of a roadway, the sensor data sensed within a distance threshold of the vehicle and within the first field-of-view;
sensing other sensor data by another camera included in the vehicle and having a second field-of-view of the roadway, the other sensor data sensed from beyond the distance threshold within the second field-of-view, the second field-of-view narrower than the first field-of-view;
fusing the sensor data and the other sensor data into fused sensor data;
a processor perceiving an object between the distance threshold and another distance threshold in a roadway view of the roadway from the fused sensor data, the other distance threshold being further away from the vehicle than the distance threshold; and
the processor adjusting configuration of vehicle operating components to adapt operation of the vehicle to the perceived object in the roadway view;
wherein sensing other sensor data by another camera comprises sensing image sensor data and LIDAR sensor data by the other camera as the other camera switches between a camera mode and a LIDAR mode.

2. The method of claim 1, wherein adjusting the configuration of vehicle operating components comprises controlling the vehicle by autonomously adjusting the configuration of the vehicle operating-components.

3. The method of claim 1, wherein sensing sensor data by a camera comprises sensing Infrared (IR) sensor data by the camera.

4. The method of claim 1, wherein fusing the sensor data and the other sensor data into fused sensor data comprises fusing the sensor data, the image sensor data, and the LIDAR sensor data into fused sensor data.

5. The method of claim 1, further comprising receiving further sensor data from a further one or more sensors, each of the further one or more sensors selected from among: a RADAR sensor, an ultrasonic sensor, a global positioning system (GPS) sensor, and an inertial measurement unit (IMU) sensor; and
wherein fusing the sensor data and the other sensor data into fused sensor data comprises fusing the sensor data, the other sensor data, and the further sensor data into fused sensor data.

6. The method of claim 3, wherein sensing Infrared (IR) sensor data comprises sensing Red Green Blue-Infrared (RGB-IR) image data, including IR pixel information, by the camera.

7. The method of claim 6, wherein fusing the sensor data and the other sensor data into fused sensor data comprises fusing the IR pixel information with the other sensor data into a reduced light environment roadway view.

8. The method of claim 1, wherein perceiving an object comprises perceiving a tracked object from a three-dimensional point cloud.

9. The method of claim 1, wherein perceiving an object comprises perceiving an object selected from among: a roadway marking, a bicycle, a pedestrian, another vehicle, or a sign.

10. The method of claim 1, wherein adjusting configuration of vehicle operating components comprises performing one of the following accelerating the vehicle, decelerating the vehicle, changing gears of the vehicle, or turning the vehicle.

11. A method comprising:
sensing sensor data by a camera included in a vehicle and having a first field-of-view of a roadway, the sensor data sensed within a distance threshold of the vehicle and within the first field-of-view;
sensing image sensor data and LIDAR sensor data by another camera included in the vehicle as the other camera switches between a camera mode and a LIDAR mode, the other camera having a second field-of-view, the image sensor data and LIDAR sensor data sensed from beyond the distance threshold within the second field-of-view, the second field-of-view narrower than the first field-of-view;
fusing the sensor data, the image sensor data, and the LIDAR sensor data into fused sensor data;
a processor perceiving an object in a roadway view of the roadway from the fused sensor data; and
the processor adjusting configuration of vehicle operating components to adapt operation of the vehicle to the perceived object in the roadway view.

12. The method of claim 11, wherein adjusting configuration of vehicle operating components comprises controlling the vehicle by autonomously adjusting the configuration of the vehicle operating components.

13. The method of claim 11, wherein sensing sensor data by a camera comprises sensing Infrared (IR) sensor data at the camera; and
wherein fusing the sensor data, the image sensor data, and the LIDAR sensor data into fused sensor data comprises fusing the Infrared (IR) sensor data, the image sensor data, and the LIDAR sensor into fused sensor data.

14. The method of claim 13, wherein sensing Infrared (IR) sensor data comprises sensing Red Green Blue-Infrared (RGB-IR) image data, including IR pixel information, by the camera.

15. The method of claim 14, wherein fusing the Infrared (IR) sensor data, the image sensor data, and the LIDAR sensor into fused sensor data comprises fusing the IR pixel information, the image sensor data, and the LIDAR sensor data into a reduced light environment roadway view.

16. The method of claim 11, further comprising receiving further sensor data from a further one or more sensors, each of the further one or more sensors selected from among: a RADAR sensor, an ultrasonic sensor, a global positioning system (GPS) sensor, and an inertial measurement unit (IMU) sensor; and
wherein fusing the sensor data, the image sensor data, and the LIDAR sensor data into fused sensor data comprises the sensor data, the image sensor data, the LIDAR, And the further sensor data into fused sensor.

17. The method of claim 11, wherein perceiving an object comprises perceiving a tracked object from a three-dimensional point cloud.

18. The method of claim 11, wherein perceiving an object comprises perceiving an object selected from among: a roadway marking, a bicycle, a pedestrian, another vehicle, or a sign.

19. The method of claim 11, wherein adjusting configuration of vehicle operating components comprises performing one of the following: accelerating the vehicle, decelerating the vehicle, changing gears of the vehicle, or turning the vehicle.

* * * * *